(12) United States Patent
Henn

(10) Patent No.: US 9,787,892 B2
(45) Date of Patent: Oct. 10, 2017

(54) SAFETY DEVICE FOR MOTORCYCLE RIDERS AND METHOD FOR OPERATING A SAFETY DEVICE FOR MOTORCYCLE RIDERS

(71) Applicant: Robert Bosch GmbH, Stuttgart (DE)

(72) Inventor: Ruediger-Walter Henn, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/855,865

(22) Filed: Sep. 16, 2015

(65) Prior Publication Data

US 2016/0075338 A1    Mar. 17, 2016

(30) Foreign Application Priority Data

Sep. 16, 2014 (DE) .......................... 10 2014 218 577

(51) Int. Cl.
*G08B 23/00* (2006.01)
*H04N 5/232* (2006.01)
*B60K 28/06* (2006.01)
*A42B 3/04* (2006.01)

(52) U.S. Cl.
CPC ......... *H04N 5/23219* (2013.01); *A42B 3/046* (2013.01); *B60K 28/066* (2013.01); *B60W 2420/42* (2013.01); *B60Y 2200/12* (2013.01)

(58) Field of Classification Search
CPC .............. G02B 27/017; G02B 27/0093; A42B 3/0433; A42B 3/044; A42B 3/0453; A42B 3/046; H04N 5/23219; B60K 28/066
USPC ................... 340/576, 439; 348/148; 701/301
See application file for complete search history.

(56) References Cited

U.S. PATENT DOCUMENTS

| 7,401,920 B1* | 7/2008 | Kranz ................... A61B 3/113 351/209 |
| 9,247,779 B1* | 2/2016 | Aloumanis ............ G08G 1/137 |
| 2013/0128046 A1* | 5/2013 | Gindin ................. G07C 5/0891 348/148 |
| 2013/0144490 A1* | 6/2013 | Lord ....................... B60T 17/22 701/41 |
| 2014/0167986 A1* | 6/2014 | Parada ................. G01C 21/365 340/905 |
| 2014/0268055 A1* | 9/2014 | Skogö .................... A61B 3/113 351/210 |

* cited by examiner

*Primary Examiner* — Thomas Mullen
(74) *Attorney, Agent, or Firm* — Norton Rose Fulbright US LLP; Gerard Messina

(57) ABSTRACT

A safety device is provided for motorcycle riders, including a safety helmet and a camera device which is situated on the safety helmet, the safety helmet having a facial area in which the face of a user of the safety helmet is situated when used as intended. It is provided that the camera device is situated on the safety helmet in such a way that it at least partially detects the facial area, the camera device being connected to at least one warning device which outputs a warning as a function of data collected by the camera device.

9 Claims, 2 Drawing Sheets

SAFETY DEVICE FOR MOTORCYCLE RIDERS AND METHOD FOR OPERATING A SAFETY DEVICE FOR MOTORCYCLE RIDERS

FIELD OF THE INVENTION

The present invention relates to a safety device for motorcycle riders, including a safety helmet for the at least partial accommodation of a head of a user and a camera device which is situated on the safety helmet, the safety helmet having a facial area in which the face of a user of the safety helmet is situated when used correctly.

Furthermore, the present invention relates to a method for operating such a safety device.

BACKGROUND INFORMATION

Safety helmets and safety devices of the kind mentioned at the outset are known from the related art. For example, camera systems are known which are integrated into motor vehicles for detecting traffic situations and traffic characteristics. In addition, it is known to position a camera device on the motorcycle safety helmet in order to record the driving operation for documentation purposes.

SUMMARY

The safety device according to the present invention has the advantage that the safety device warns the user of the safety helmet in hazardous situations, so that hazardous situations are resolved and the safety of the user of the safety helmet is increased. For this purpose, it is provided according to the present invention that the camera device is situated on the safety helmet in such a way that it detects the facial area when the safety helmet is used as intended, the camera device being connected to at least one warning device which outputs a warning as a function of data collected by the camera device. Thus, for example, based on the image detected by the camera device which includes the facial area of the safety helmet and thus the face of the user of the safety helmet, it is possible to infer the state of the user or the motorcycle rider. Thus, for example, with the aid of known methods, fatigue monitoring may be carried out which monitors the eyes of the rider to determine whether they are open or are closed over a predefinable period of time. The camera device and warning device integrated into the safety helmet thus now also make it possible to monitor and warn a motorcycle rider accordingly.

According to one advantageous refinement of the present invention, it is provided that the camera device is situated and oriented in such a way that it detects the eye area of the facial area. As a result, it is possible to detect the eyes of the rider when the safety helmet is used as intended and to carry out the aforementioned fatigue recognition.

It is particularly preferably provided that the safety helmet has an opening in the facial area and that the camera device is situated at the edge of the opening. The camera is thus provided near the face of the user and is thereby able in particular to detect the eyes of the wearer in a simple manner. It is particularly preferably provided that a single camera device is provided on the safety helmet which detects the face or the eyes of the user. Alternatively, it is preferably provided that the camera device includes at least two cameras or camera sensors which are positioned in such a way that they detect one eye of the user. The positioning at the edge of the opening makes it possible to integrate the camera device into the safety helmet in such a way that its outer contour does not change, so that it is possible to maintain a streamlined shape of the safety helmet.

Furthermore, it is preferably provided that the warning device is associated with the facial area. While the warning device may also generally be provided on the motorcycle itself, and communicates in a wired or wireless manner with the camera device, here, it is preferably provided that warning devices and camera devices are situated together directly on the safety helmet, so that a compact and portable safety device is provided which offers the desired advantages, regardless of the intended application.

Furthermore, it is preferably provided that the warning device includes at least one illuminant, in particular a light-emitting diode. As a result of the association of the warning device with the facial area, the light-emitting diode or at least a light emitted by the light-emitting diode is located in the field of vision of the wearer, so that the wearer is able to perceive this visual warning in a simple manner and is able to respond accordingly. Alternatively or additionally, it is preferably provided that the warning device includes a loudspeaker for outputting an acoustic warning signal.

Furthermore, it is preferably provided that at least one additional camera device is situated on the safety helmet, which is oriented facing away from the facial area in order to detect surroundings, in particular a roadway. Therefore, the additional camera device does not face the wearer of the safety helmet, but rather the surroundings around the wearer. In particular, the camera device is designed and oriented in such a way that a roadway along which the wearer moves with his/her motorcycle and the safety helmet is detected. By comparing data collected by the camera device and by the additional camera device, it is possible to infer hazardous situations and to output a warning with the aid of the warning device in order to further increase the safety of the motorcycle rider.

Particularly preferably, it is provided that the additional camera device or a computing device connected to the camera device ascertains a direction of travel as a function of data collected by the additional camera device. Based on the image and/or video data collected by the camera device, it is possible to ascertain flow vectors which indicate a direction of travel. As a result, it is possible to ascertain the direction of travel with the aid of the additional camera device, in particular regardless of the orientation of the safety helmet.

Furthermore, it is preferably provided that the camera device or a computing unit which is connected to the camera device ascertains a viewing direction of the user of the safety helmet as a function of data collected by the camera device. In this case, a technology which is already known from automotive engineering may be applied. As a result of knowledge of the viewing direction of the user, it is possible, for example, to ascertain the user's alertness.

Particularly preferably, it is provided that a computing unit is provided which is connected to the camera device and to the additional camera device and which compares the direction of travel to the viewing direction in order to output a warning signal with the aid of the warning device, in particular in the event of a deviation which exceeds a predefinable value. Thus, if the computing unit detects a deviation of the direction of travel from the viewing direction which exceeds a predefinable value, it triggers the warning device to output a warning signal, in particular a visual warning signal. By comparing the direction of travel with the viewing direction, it is ascertained whether the driver is looking in the direction of travel. If this is not the case, the warning signal is correspondingly output.

In addition, the traffic scene may be observed and evaluated with the aid of the additional camera device, so that critical traffic situations are able to be detected. While detecting a critical traffic situation, for example, an imminent rear-end collision, the camera device or a computing unit associated with the additional camera device triggers the warning device to output a warning signal.

The method according to the present invention is characterized in that a face of the user is detected with the aid of the camera device, and a hazardous situation is identified based on the detected face of the user, and a warning is output if a hazardous situation exists. The aforementioned advantages thus result. Additional features and advantages result from the ones previously described.

DETAILED DESCRIPTION

Figure 1:
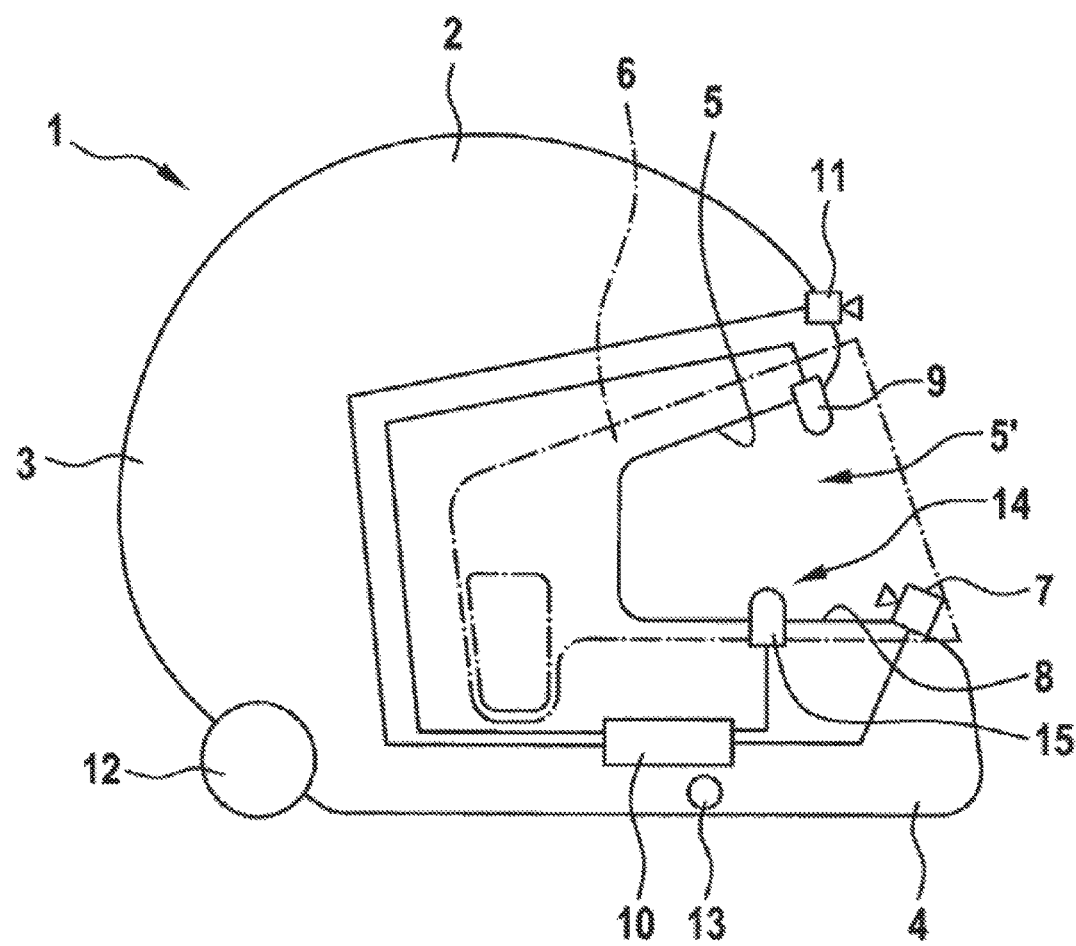
FIG. 1 shows a simplified side view of a safety device.

FIG. 1 shows a safety device 1 which includes a safety helmet 2 depicted in the side view. Safety helmet 2 is designed as a full-face helmet for motorcycle riders and for this purpose includes a helmet shell 3 and a chin protector 4 designed as one piece with helmet shell 3, an opening 5 remaining between chin protector 4 and helmet shell 3, via which a user of safety helmet 2 is able to look out of safety helmet 2 when used as intended.

In this respect, opening 5 defines a facial area of safety helmet 2 in which the face of the user is situated when used as intended. Optionally, opening 5 may be closed via a pivotable, transparent visor 6 in order to protect the user from an airstream or the like.

A camera device 7 is associated with safety helmet 2, which is provided at edge 8 of opening 5 and is oriented toward facial area 5', so that the face of the user is detectable using camera device 7 (when used as intended). For this purpose, camera device 7 includes, for example, a camera sensor or video sensor. In particular, it may be provided that the camera sensor is an infrared camera sensor, so that the face of the user is detectable even in the dark. For this purpose, in addition, at least one infrared light emitter 9 is additionally provided which correspondingly illuminates the face in the dark without blinding the rider.

Furthermore, safety device 1 includes a computing unit 10 which is connected to camera device 7 and infrared light emitter 9 in order to control them accordingly. In addition, computing unit 10 evaluates the data collected by camera device 7 as described below.

Safety device 1 furthermore includes an additional camera device 11 which is situated on safety helmet 2 and is oriented facing away from facial area 5' in such a way that it detects the surroundings of safety helmet 2. The camera device is oriented in such a way that it detects the surroundings ahead of safety helmet 2 or in the viewing direction of the user, if the user looks straight ahead through opening 5. Additional camera device 11 is also connected to computing device 10, which evaluates the data collected by camera device 11.

Safety device 1 furthermore includes an electrical energy store 12 which is designed in particular as a rechargeable energy store and which is connected to camera devices 7, 11, light-emitting diode 9, and computing device 10, in order to supply them with electrical energy. It is possible to make contact with electrical energy store 12 and, for example, to charge it via a contact terminal 13.

In addition, safety device 1 includes a warning device 14 which includes a controllable light-emitting diode 15 at the edge of opening 5 of safety helmet 2. Light-emitting diode 15 is connected to control device 10 and is controlled by it. Preferably, activated light-emitting diode 15 radiates light in a warning color, in particular red light.

Figure 2:
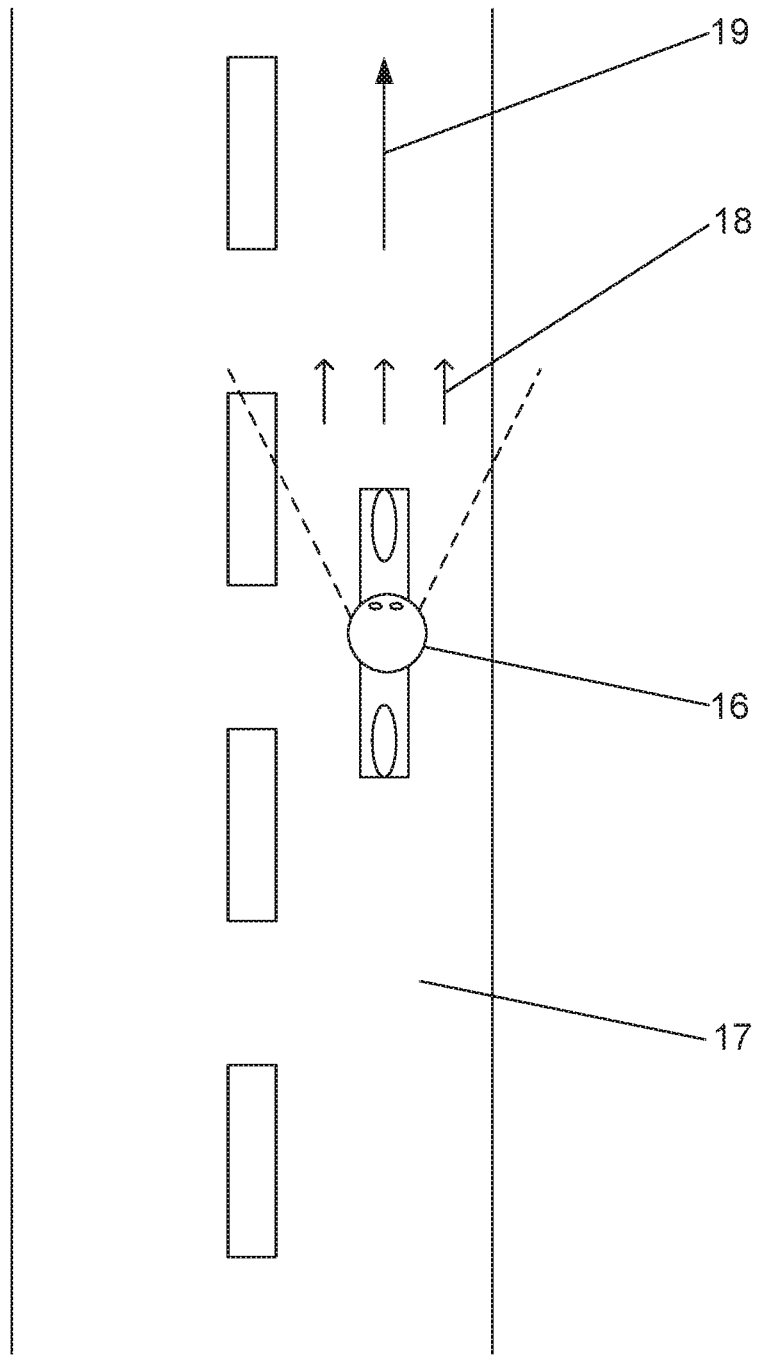
FIG. 2 shows an exemplary view of a user of the safety device viewing a roadway and/or other surroundings.

FIG. 2 shows an exemplary view of a user 16 of the safety helmet 2 viewing a roadway 17 and/or other surroundings. Safety device 1 has the task of warning the user of safety helmet 2 if the user is not alert, for example, in the event of an imminent collision, or if the user is not looking at the roadway in the direction of travel. For this purpose, it is provided that the face of the rider is observed, in particular a viewing direction 18 of the rider is ascertained, with the aid of camera device 7 and, if necessary, at least one infrared light emitter 9. Simultaneously, a direction of travel 19 is determined with the aid of additional camera device 11, for example, based on ascertained flow vectors. The data collected by camera device 7 and by additional camera device 11 are processed by computing device 10 in such a way that the detected viewing direction 18 of the rider is compared to the detected direction of travel 19. If it is ascertained that viewing direction 18 deviates from the direction of travel 19, in particular exceeds a predefinable value, it is thus identified that the rider has not looked at the roadway 17 or in the direction of travel 19, and that a hazardous situation accordingly exists. In this case, computing device 10 triggers warning device 14 to activate the illuminant or light emitting diode 15 in order to make the driver visually aware of the hazardous situation.

In addition, additional camera device 11 may also be used to evaluate the traffic situation or the traffic scene in the direction of travel, and if a hazardous situation exists, for example, an imminent rear-end collision situation, to make the driver aware of it by activating light-emitting diode 15.

Additional camera device 11 is preferably integrated or at least essentially integrated into safety helmet 2 in order to reduce a risk of injury and a wind resistance of safety helmet 2. The wearing comfort of the safety helmet is also increased via the weight distribution in comparison to a camera device attached to the outside of safety helmet 2. With the aid of additional camera device 11, the surroundings are detected and evaluated for determining the direction of travel as well as the head position with respect to the direction of travel. Additional camera device 11 may be situated as depicted in the FIGURE, above visor 6 or below the visor in the area of chin protector 4 of the full-face helmet. In addition, the preferred positioning of energy store 12 in the rear area of safety helmet 2 allows the additional weight to be compensated for on the front side of safety helmet 2.

Camera device 7 is preferably situated in the interior, i.e., within visor 6 in the closed state, in the center of opening 5, so that it is between the eyes of the user when used as intended, or is alternatively on the left or right in front of one eye. It may also be provided that two camera devices 7 or two camera sensors of camera device 7 are provided, each being associated with one of the eyes.

Safety device 1 may also be permanently connected to a power supply network, for example, of the motorcycle, with the aid of contact terminal 13 which, for example, is designed as a plug connector.

What is claimed is:

1. A safety device for a motorcycle rider, comprising:
a safety helmet;
a camera device situated on the safety helmet, wherein:
the safety helmet includes a facial area in which a face of the motorcycle rider is situated,
the camera device is situated on the safety helmet in such a way that the camera device directly faces toward the facial area and at least partially detects the facial area, and
at least one additional camera device is situated on the safety helmet and oriented to face forward from the facial area to detect surroundings of the motorcycle rider including a roadway; and
a warning device connected to the camera device and outputting a warning as a function of data collected by the camera device,
wherein the camera device ascertains a viewing direction of the motorcycle rider as a function of data collected by the camera device and the at least one additional camera device ascertains a direction of travel of the motorcycle rider as a function of data collected by the additional camera device, and wherein the warning is output when a deviation between the direction of travel and the viewing direction exceeds a predefined value.

2. The safety device as recited in claim 1, wherein the camera device is situated and oriented in such a way that the camera device detects an eye area of the facial area.

3. The safety device as recited in claim 1, wherein the safety helmet has an opening in the facial area and the camera device is situated at an edge of the opening.

4. The safety device as recited in claim 1, wherein the warning device is situated so that it is perceivable by the rider.

5. The safety device as recited in claim 1, wherein the warning device includes at least one illuminant.

6. The safety device as recited in claim 5, wherein the illuminant includes a light-emitting diode.

7. The safety device as recited in claim 1, wherein the at least one additional camera device and a computing device connected to the additional camera device ascertains an orientation of the safety helmet as a function of data collected by the additional camera device.

8. The safety device as recited in claim 1, further comprising:
a computing device connected to the camera device and the additional camera device, the computing device comparing the direction of travel of the motorcycle rider with the viewing direction of the motorcycle rider to determine the deviation between the direction of travel and the viewing direction.

9. A method for operating a safety device, the method comprising:
detecting a face of a user via a camera device directly facing toward the face of the user, the camera device being situated on a safety helmet that at least partially accommodates a head of the user;
ascertaining a viewing direction of the user as a function of data collected by the camera device;
detecting surroundings of the user via an additional camera device situated on the safety helmet and oriented facing forward and away from the face of the user;
ascertaining a direction of travel of the user as a function of data collected by the additional camera device;
identifying a hazardous situation when a deviation between the direction of travel and the viewing direction exceeds a predefined value; and
outputting a warning if a hazardous situation is identified.

\* \* \* \* \*